(12) United States Patent
Judge et al.

(10) Patent No.: US 11,111,961 B2
(45) Date of Patent: Sep. 7, 2021

(54) COANDA EFFECT BEARING COOLER

(71) Applicant: Flowserve Management Company, Irving, TX (US)

(72) Inventors: Scott C. Judge, Bethelehm, PA (US); Andrew Todd Koehler, Irving, TX (US); Stephen R. Schappert, Irving, TX (US)

(73) Assignee: Flowserve Management Company, Irving, TX (US)

( * ) Notice: Subject to any disclaimer, the term of this patent is extended or adjusted under 35 U.S.C. 154(b) by 148 days.

(21) Appl. No.: 16/487,293

(22) PCT Filed: Jan. 10, 2018

(86) PCT No.: PCT/US2018/013100
§ 371 (c)(1),
(2) Date: Aug. 20, 2019

(87) PCT Pub. No.: WO2018/156253
PCT Pub. Date: Aug. 30, 2018

(65) Prior Publication Data
US 2020/0056662 A1    Feb. 20, 2020

Related U.S. Application Data

(60) Provisional application No. 62/462,040, filed on Feb. 22, 2017.

(51) Int. Cl.
*F16C 37/00* (2006.01)
*F04D 29/54* (2006.01)
(Continued)

(52) U.S. Cl.
CPC ............ *F16C 37/00* (2013.01); *F04D 29/547* (2013.01); *F04D 25/08* (2013.01); *F04D 29/441* (2013.01);
(Continued)

(58) Field of Classification Search
CPC ...... F04D 25/08; F04D 25/082; F04D 29/441; H02K 9/14; H02K 9/06
See application file for complete search history.

(56) References Cited

U.S. PATENT DOCUMENTS 2,947,892 A     8/1960  Inculet et al.
3,213,304 A *  10/1965  Landberg .............. F04D 29/287
                                                            310/53
(Continued)

FOREIGN PATENT DOCUMENTS

DE          19618996 A1    11/1997
KR      1020160149396 A    12/2016

OTHER PUBLICATIONS

Foreign Office Action for European Patent Appl. No. 18757487.6, dated Jun. 23, 2020, 4 Pages.
(Continued)

*Primary Examiner* — Woody A Lee, Jr.
*Assistant Examiner* — Brian O Peters
(74) *Attorney, Agent, or Firm* — Maine Cernota & Rardin

(57) ABSTRACT

A compact, energy efficient air cooling system for a rotating shaft bearing module includes a Coanda surface having a periphery that smoothly curves from a radial center to axial alignment with a side of the module. A fan blade mounted on the shaft directs an airflow radially parallel and adjacent to the Coanda surface, causing the airflow to be bent by the Coanda effect from radial to axial, and to be directed along the side of the housing. Embodiments that can be applied to existing housings include a Coanda panel adjacent to the housing end face. A double suction fan blade can draw both external air and air from between the panel and the housing. In other embodiments the housing end face itself is a Coanda surface. A fan cover can have an inwardly curved periphery that forms a reduced gap or nozzle with the Coanda surface.

18 Claims, 9 Drawing Sheets

(51) Int. Cl.
*F04D 25/08* (2006.01)
*F04D 29/44* (2006.01)

(52) U.S. Cl.
CPC ...... *F05D 2260/60* (2013.01); *F16C 2360/46* (2013.01)

(56) References Cited

U.S. PATENT DOCUMENTS

| | | | |
|---|---|---|---|
| 4,742,257 A | | 5/1988 | Carpenter |
| 7,857,256 B2* | | 12/2010 | Hatton .................. B64C 39/064 |
| | | | 244/23 C |
| 2007/0224044 A1 | | 9/2007 | Hong et al. |
| 2007/0273220 A1 | | 11/2007 | Koyama et al. |
| 2008/0213090 A1 | | 9/2008 | Hatton |
| 2014/0062232 A1 | | 3/2014 | Cocks |
| 2016/0102676 A1* | | 4/2016 | You ........................ F04D 29/38 |
| | | | 415/1 |

OTHER PUBLICATIONS

Foreign Office Action for India Appl. No. 201937033723, dated Jun. 16, 2020, 5 Pages.
International Preliminary Report on Patentability for Appl No. PCT/US18/013100 dated Aug. 27, 2019, 9 pages.
PCT Search Report and Written Opinion for Appl No. PCT/US2018/013100 dated Apr. 25, 2018, 12 pages.
Office Action for European Patent Appl. No. 18757487.6, dated Nov. 3, 2020, 6 Pages.
Mexican Office Action for Appl No. MX/a/2019/009879 dated Oct. 2, 2019, 3 pages.

* cited by examiner

COANDA EFFECT BEARING COOLER

RELATED APPLICATIONS

This application is a national phase application filed under 35 USC § 371 of PCT Application No. PCT/US18/13100 with an international filing date of Jan. 10, 2018. PCT/US18/13100 claims the benefit of U.S. Provisional Application No. 62/462,040, filed Feb. 22, 2017. Both of these applications are herein incorporated by reference in their entirety for all purposes.

FIELD OF THE INVENTION

The invention relates to rotating shaft devices, and more particularly, to apparatus for cooling bearing housings and other modules from which rotating shafts extend.

BACKGROUND OF THE INVENTION

Centrifugal pumps and other rotating shaft devices generally include radial and/or axial bearings that support the weight of the rotating shaft and also absorb radial and axial forces and vibrations that arise from a number of different sources, including hydraulic and mechanical sources. The bearings are typically surrounded by bearing housings and are located on either end of the shaft. In the case of centrifugal pumps, the bearings are typically external to the pumped fluid.

While there are many styles of bearings that can support a rotating shaft, with varying degrees of complexity and cost, it is unavoidable that bearings will generate heat in proportion to the amount of load that they are carrying. Often, this excess heat must be removed from the bearings and transferred to the surrounding environment in order to maintain the bearings at temperatures below their limits, ensure stable bearing operation, and prevent bearing failure. It is generally desirable for the cooling of bearings to be as efficient as possible, because increased heat transfer from the bearing housing (and therefore the bearings) to the environment allows any particular bearing design to be used with higher loads and in hotter ambient conditions.

When simple radiant and naturally convective cooling is insufficient, one approach is to provide a separate fan and duct system that blows air onto the bearing housing to increase the transfer of heat away from the bearings. However, it can be expensive and excessively bulky to provide a completely independent fan and duct system for air cooling the bearings.

Instead, with respect to FIG. 1A, it is common for a rotating shaft device 100 to be configured such that the ends of the rotating shaft 104 extend beyond the bearing housings 102. This allows external fan blades 106 to be mounted on the shaft ends 104, so that separate fan motors are not required. The fan blades 106 are configured to blow air onto the bearing housings 102 in an axial direction, so that the air directly impacts the end face 114 of the bearing housing. However, it is often desirable to cool the sides 112 of the bearing housing 102 as well as the end faces 114.

One approach is to make the fan blades 106 larger in diameter than the bearing housings 102, so that they can directly blow air across the sides 112 of the housings 102. Typically, the bearing housings 102 are surrounded by ductwork 108 so as to maintain the flowing air close to the sides of the bearing housings 102. In addition, radial fins 110 are often included along the sides 112 of the bearing housings 102 so as to increase the convective heat transfer from the external bearing housing surfaces to the flowing air.

While this approach is effective in cooling the bearings, it is energetically inefficient, due to frictional losses between the flowing air and the ductwork and the considerable amount of "wasted" airflow that is generated by the fan but does not contribute significantly to cooling of the bearings. Also, the large size of the fan blades, which are typically made of metal so as to be sufficiently rigid, places a significant additional load onto the rotating shaft, and can lead to increased heating of the bearings, due to rotor imbalances and other rotor dynamic issues. In addition, the ductwork that surrounds the bearing housings adds considerable bulk to the overall system.

As an alternative, with respect to FIG. 1B, smaller diameter fan blades 106 can be used, whereby the air flow is directed by the ductwork 108 from the end faces 114 of the housings 102 around to the sides 114 of the housings. However, this redirection of the air flow by the ductwork 108 leads to additional energy loss, which must be compensated by drawing more energy from the rotating shaft 104.

What is needed, therefore, is an apparatus for applying cooling air to the bearing housings of a rotating shaft device that is energetically efficient, does not add significant load to the rotating shaft, and requires only a minimal increase in system bulk.

SUMMARY OF THE INVENTION

A compact and energetically efficient apparatus for applying cooling air to a bearing housing of a rotating shaft device is disclosed. The apparatus does not add significant load to the rotating shaft, and requires only a minimal increase in system bulk.

According to the present invention, a fan blade that is smaller in diameter than the bearing housing is mounted on the extending end of the rotary shaft adjacent to a housing end surface, and is configured to direct a flow of air radially outward and tangential to the end surface. The center of the housing end surface is perpendicular to the rotating shaft, while a periphery of the housing end surface makes a smoothly curved transition to axial alignment with the side of the housing. Instead of relying on ductwork, the disclosed apparatus makes use of the Coanda effect to redirect the airflow from radial to axial, and to maintain the airflow in close proximity to the housing. Accordingly, the housing end surface is referred to herein as the "Coanda" surface.

The Coanda effect can be defined as "the tendency of a fluid jet to stay attached to a convex surface" (Tritton, D. J., Physical Fluid Dynamics, Van Nostrand Reinhold, 1977 (reprinted 1980), Section 22.7, The Coandă Effect), or perhaps even more accurately as "the tendency of a jet of fluid emerging from an orifice to follow an adjacent flat or curved surface and to entrain fluid from the surroundings so that a region of lower pressure develops" (http://www.merriam-webster.com/dictionary/Coanda % 20effect). The effect is related to the "lift" that is developed when air flows over the curved surface of an airplane wing, creating a region of low pressure that causes the flowing air to follow the contours of the wing and to behave as if it were "attached" thereto.

The key requirements for the Coanda effect to operate are that the flow of air must be turbulent and must be parallel and immediately adjacent to the surface, and that the curvature of the surface must be smooth, continuous and above a minimum bend radius. In embodiments, the Coanda surface is textured, so as to increase the turbulence of the air flowing over the surface and thereby increase the Coanda effect adherence of the air to the Coanda surface.

A first general aspect of the present invention is an air cooling system for a bearing housing of a rotating shaft device. The cooling system includes a Coanda panel that is mountable in close proximity to the end face of the bearing housing and a fan blade that is attachable to the rotating shaft adjacent to an externally facing Coanda surface of the Coanda panel. A second general embodiment of the present invention is a bearing housing system that is air-cooled, in which the end face of the bearing housing is configured as a Coanda surface, and a fan blade is attached to the rotating shaft adjacent and external to the bearing housing end face.

Embodiments of both general aspects can include a cover mounted external to the fan blade that collects the air flow from the fan blade and guides it tangentially along the Coanda surface. The cover is smaller in diameter than the Coanda surface and the bearing housing. The periphery of the cover can be curved inward so as to form a reduced gap with the Coanda surface that functions as a nozzle to accelerate and direct the airflow and improve the uniformity of the flow.

The airflow created by the fan blade is initially radial in direction, i.e. perpendicular to the shaft, and thereby parallel and adjacent to the central region of the Coanda surface. Upon reaching the curved periphery of the Coanda surface, the airflow is compelled by the Coanda effect to follow the curvature, and thereby to flow axially along the side of the housing.

By relying on the Coanda effect rather than on ducting to maintain the airflow close to the side of the bearing housing, the bulk and cost of the cooling system is reduced, and also the cooling efficiency is further increased because heat that might otherwise be trapped within the airflow by ducting is able to radiate outward from the flowing air directly to the surrounding environment. In addition, the number and complexity of parts that must be manufactured and assembled is reduced.

Due to the reduced fan size and power requirements, in embodiments the fan blade is made from a polymer or other lightweight, non-metallic material, thereby reducing the likelihood of fan-induced rotor imbalance, improving rotor stability, and reducing the chance of rotor dynamic issues during operation of the device.

In embodiments of the first general aspect, the fan blade is a double-suction blade that draws air both from its exterior side and from its interior side, thereby drawing air out of the space between the Coanda panel and the end face of the bearing housing, and/or circulating air within the intersurface space. In some of these embodiments, the fan blade edges extend inward to the rotating shaft.

It should be understood that while reference is made throughout this disclosure to "bearings" and to a "bearing housing," the present disclosure is equally applicable to air cooling of any housing of a module from which a rotating shafts extends.

A first general aspect of the present invention is an apparatus for air cooling a module of a system that includes a rotating shaft extending through and beyond an end face of a housing of the module, the end face being substantially perpendicular to the rotating shaft and a side of the housing being substantially parallel to the rotating shaft. The system includes a Coanda panel that can be mounted adjacent to the end face of the housing, the Coanda panel having a central opening through which the shaft can extend, an exterior Coanda surface of the Coanda panel having a central region that is radially perpendicular to the shaft and a periphery that curves smoothly from radial to axial, so that a rim of the Coanda surface is directed axially and is substantially aligned with the side of the housing, and a fan assembly including a fan blade that can be mounted to the shaft proximal and exterior to the Coanda surface, the fan blade being smaller in diameter than the housing, the fan assembly being configured to direct a flow of air parallel and adjacent to the Coanda surface, so that the air is attached by the Coanda effect to the Coanda surface and is thereby redirected by the periphery of the Coanda surface to flow axially along the side of the housing.

In embodiments of this first general aspect, the fan blade is a double suction fan blade that is configured to draw air both from an exterior side of the fan blade and through the central opening of the Coanda panel from a space between the Coanda panel and the end face of the housing.

In any of the above embodiments, the fan blade can include edges that extend substantially to the rotating shaft.

A second general aspect of the present invention is an air-cooled rotating shaft apparatus that includes a rotating shaft, a module having a housing, the housing having an end face and a side, wherein the rotating shaft extends through and beyond the end face, the side of the housing is substantially parallel to the rotating shaft, and an exterior surface of the end face is a Coanda surface having a central region that is radially perpendicular to the shaft and a periphery that curves smoothly from radial to axial, so that a rim of the Coanda surface is directed axially and is substantially aligned with the side of the housing, and a fan assembly including a fan blade mounted to the shaft proximal and exterior to the Coanda surface, the fan blade being smaller in diameter than the housing, the fan assembly being configured to direct a flow of air parallel and adjacent to the Coanda surface, so that the air is attached by the Coanda effect to the Coanda surface and is thereby redirected by the periphery of the Coanda surface to flow axially along the side of the housing.

In embodiments of this second general aspect, the side of the housing includes axially extending radial fins.

In any of the above embodiments of either general aspect, the fan assembly can further includes a fan cover, the fan blade being located between the fan cover and the Coanda surface. In some of these embodiments, the fan cover includes a periphery that is curved inward so as to form a reduced gap between the periphery of the cover and the Coanda surface. In any of these embodiments, the Coanda surface can include radially extending axial fins surrounding the fan blade and located between the fan cover and the Coanda surface.

In any of the above embodiments of either general aspect, a bend radius of the Coanda surface periphery can be at least two inches.

In any of the above embodiments of either general aspect, the fan blade can be made from a non-metallic material. In some of these embodiments, the fan blade is made of a polymeric material.

In any of the above embodiments of either general aspect, the module can be a bearing module that supports the rotating shaft.

In any of the above embodiments of either general aspect, the side of the housing can be configured such that it is not surrounded by ductwork.

And in any of the above embodiments of either general aspect, the Coanda surface can be textured.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a compact and energetically efficient apparatus for applying cooling air to a bearing housing of a rotating shaft device. The cooling apparatus does not add significant load to the rotating shaft, and requires only a minimal increase in system bulk.

According to the present invention, a fan blade that is smaller in diameter than the bearing housing is mounted on the extending end of the rotary shaft adjacent to a Coanda surface, and is configured to direct a flow of air radially outward and tangential to the Coanda surface. The center of the Coanda end surface is perpendicular to the rotating shaft, while a periphery of the Coanda end surface makes a smoothly curved transition to axial alignment with the side of the housing.

Instead of relying on ductwork, the disclosed apparatus makes use of the Coanda effect to redirect the airflow from radial to axial, and to maintain the airflow in close proximity to the housing. In embodiments, the Coanda surface is textured, so as to increase the turbulence of the air flowing over the surface and thereby increase the Coanda effect adherence of the air to the Coanda surface. And in some embodiments, the curved periphery of the Coanda surface has a bend radius that is at least two inches.

Figure 1A:
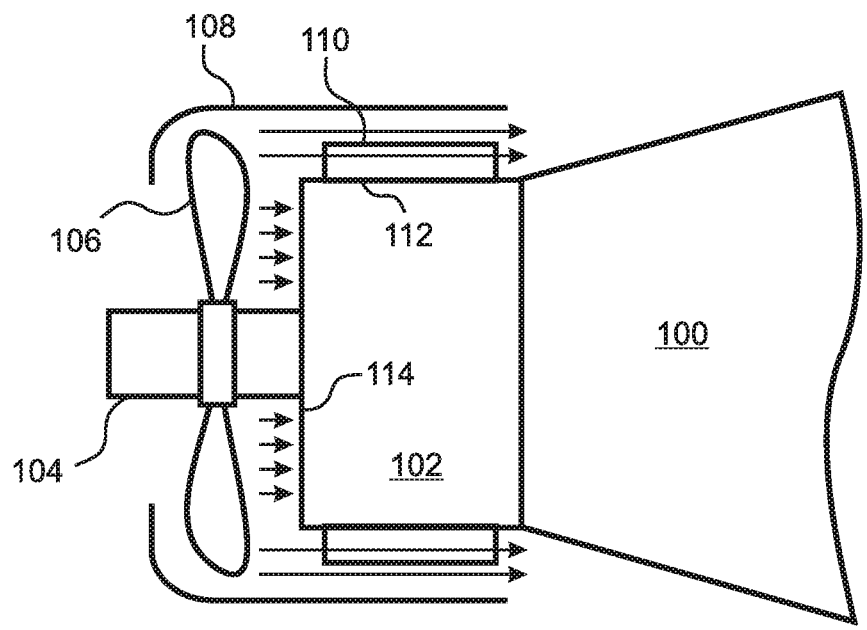
FIG. 1A is a cross-sectional illustration of an air cooling system of the prior art that includes a large fan blade.
Figure 1B:
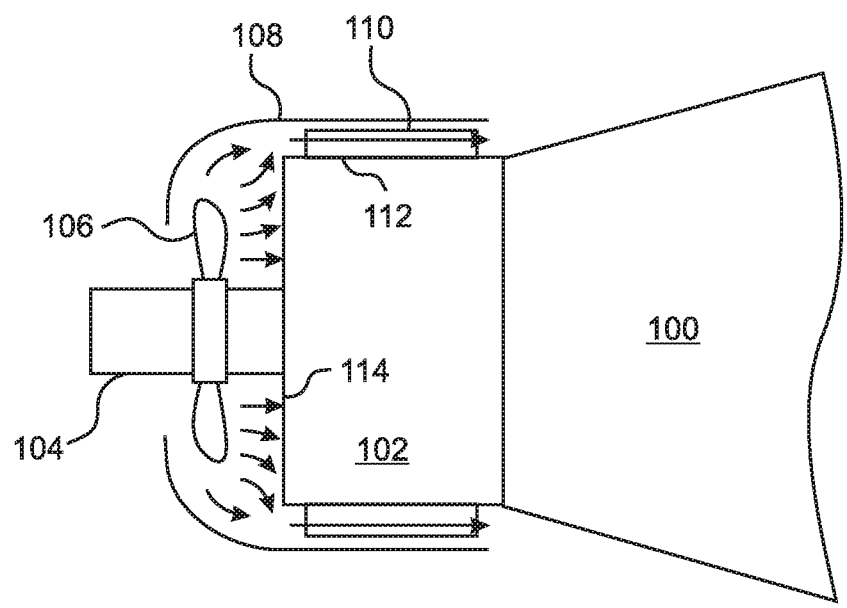
FIG. 1B is a cross-sectional illustration of an air cooling system of the prior art that includes a small fan blade.
Figure 2:
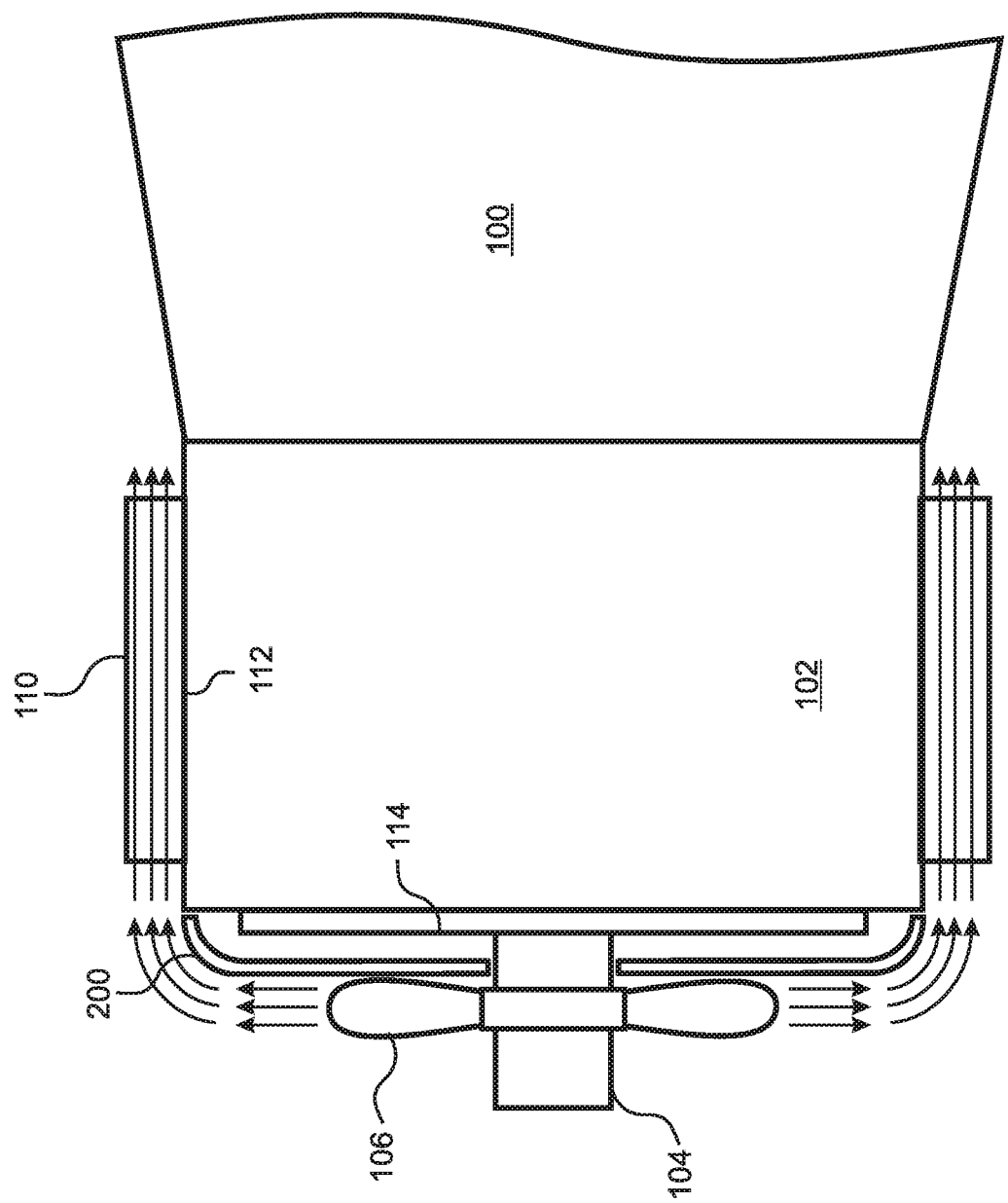
FIG. 2 is a cross-sectional illustration of an embodiment of the present invention.

With reference to FIG. 2, a first general aspect of the present invention is an air cooling system for a bearing housing 102 of a rotating shaft device 100. The disclosed device includes a Coanda panel 200 that is mountable in close proximity to the end face 114 of the bearing housing 102 and a fan blade 106 that is attachable to the rotating shaft 104 adjacent to an external Coanda surface of the Coanda panel 200. The Coanda surface 200 has a central region that is perpendicular to the rotating shaft 104 and a periphery that makes a smoothly curved transition to axial alignment with the side 112 of the housing.

Figure 3:
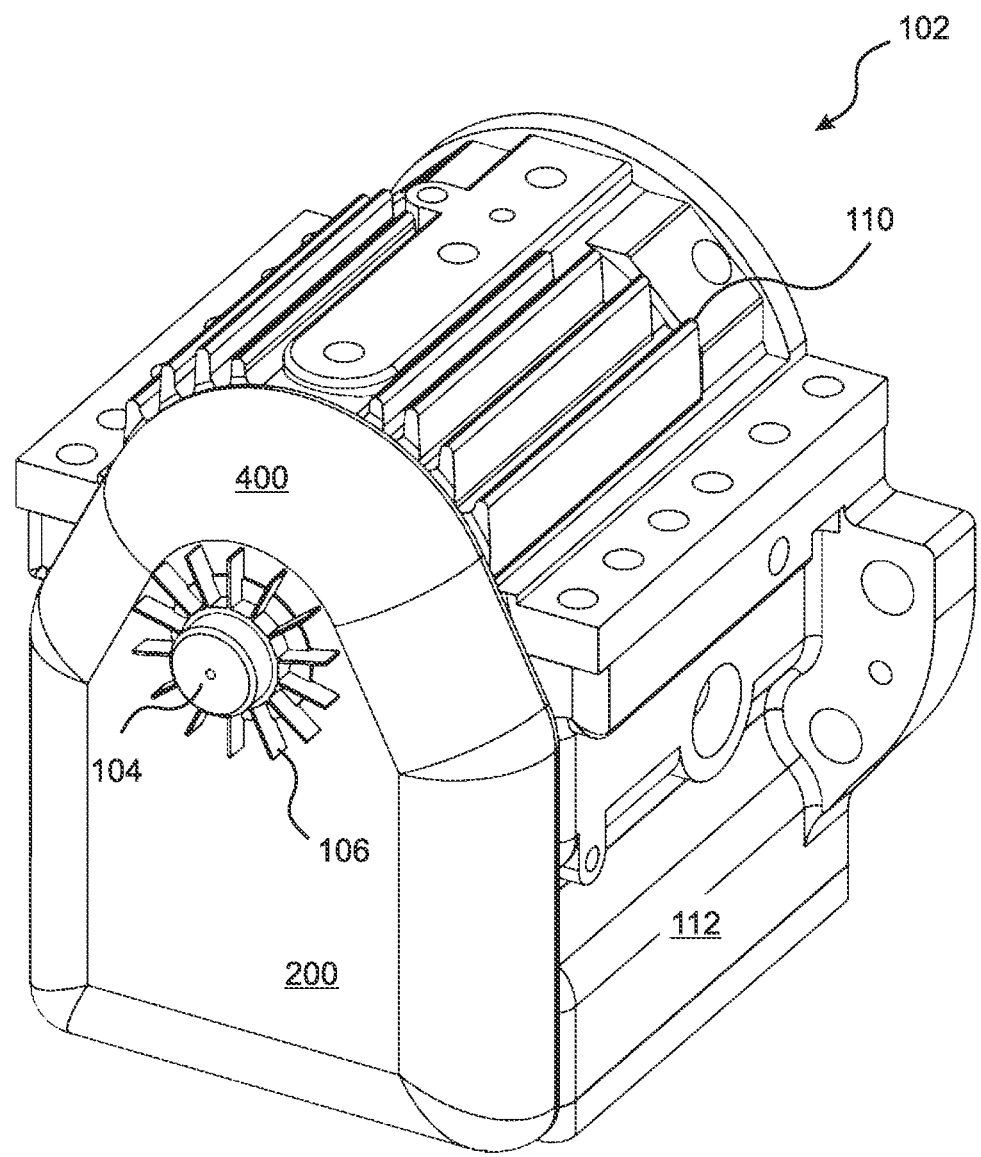
FIG. 3 is a perspective view drawn to scale of an embodiment of the present invention similar to FIG. 2.

The fan blade 106 is configured to direct an airflow in a radial direction that is parallel and adjacent to the central region of the Coanda surface 200, such that the airflow becomes "attached" to the Coanda surface 200 due to the Coanda effect. When the airflow reaches the periphery of the Coanda surface 200, it follows the curvature of the Coanda surface 200 and is thereby redirected from radial to axial, so that it remains in close proximity to the side 112 of the housing 102. FIG. 3 is a perspective view drawn to scale of the embodiment of FIG. 2.

Figure 4C:
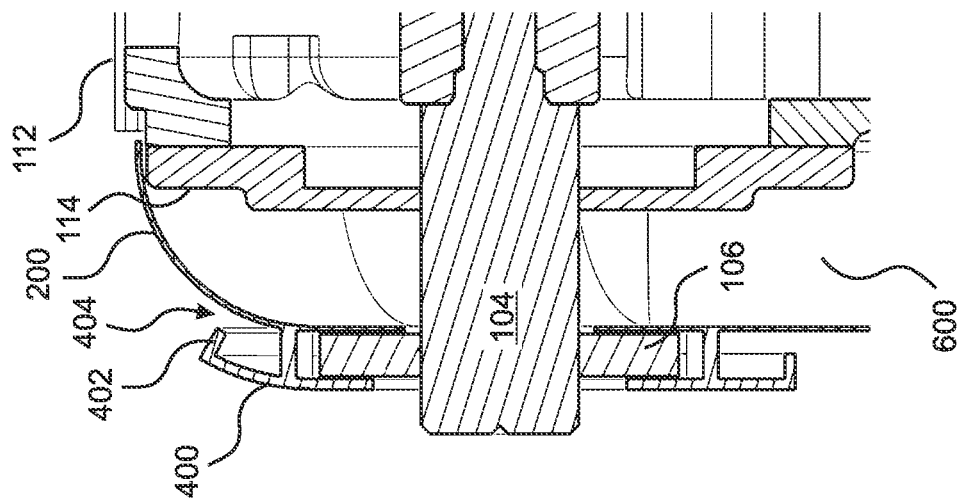
FIG. 4C is a cross-sectional view drawn to scale of an embodiment similar to FIG. 4B, but wherein the fan cover has an inwardly curved periphery.
Figure 4B:
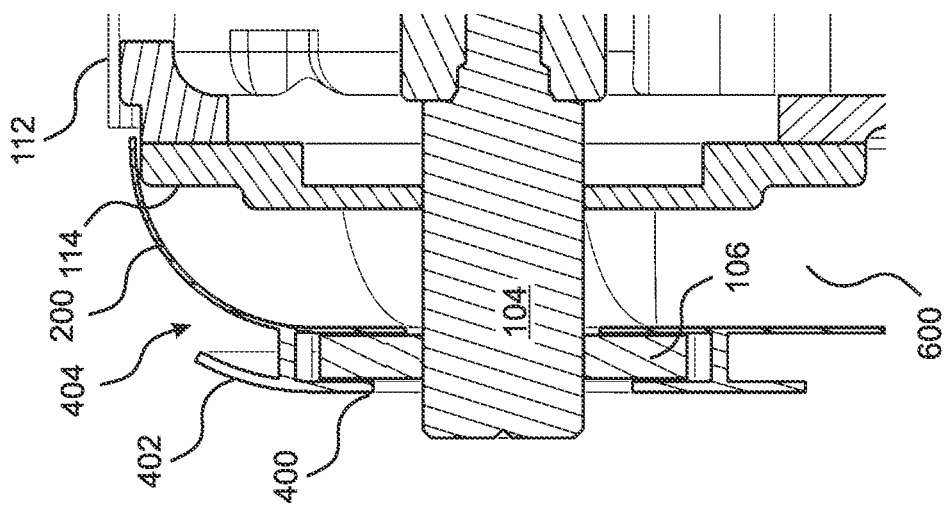
FIG. 4B is a cross-sectional view drawn to scale of the embodiment of FIG. 4A.
Figure 4A:
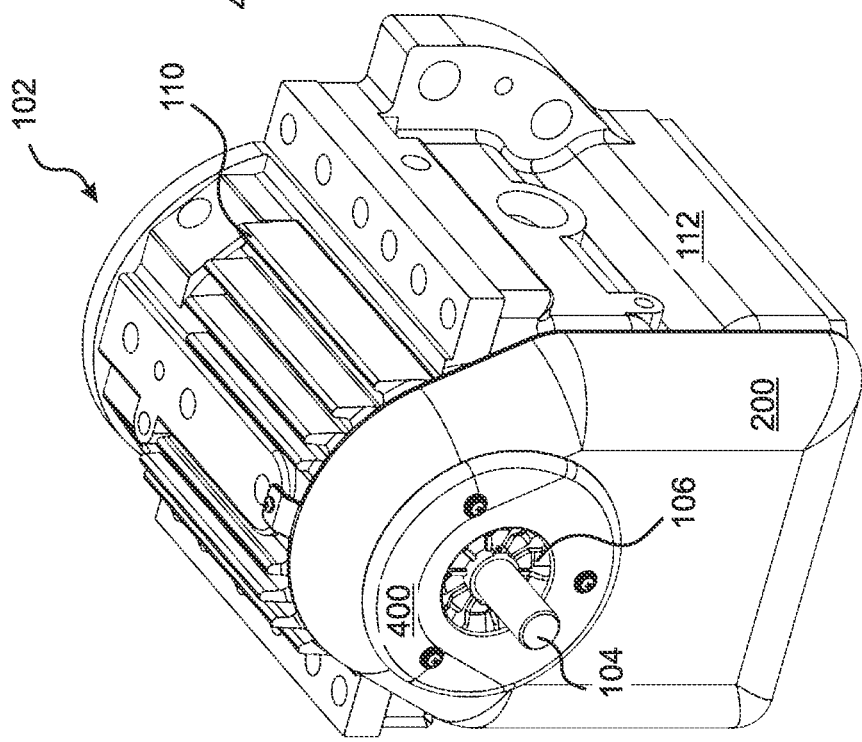
FIG. 4A is a perspective view drawn to scale of an embodiment of the present invention similar to FIG. 3A, but including a fan blade cover.

With reference to FIG. 4A, embodiments include a cover 400 mounted external to the fan blade 106 that collects the air flow from the fan blade 106 and guides it along the Coanda surface 200. The cover 400 is smaller in diameter than the Coanda surface 200 and the bearing housing 102. A cross sectional side view of the embodiment of FIG. 4A is shown in FIG. 4B.

Figure 4D:
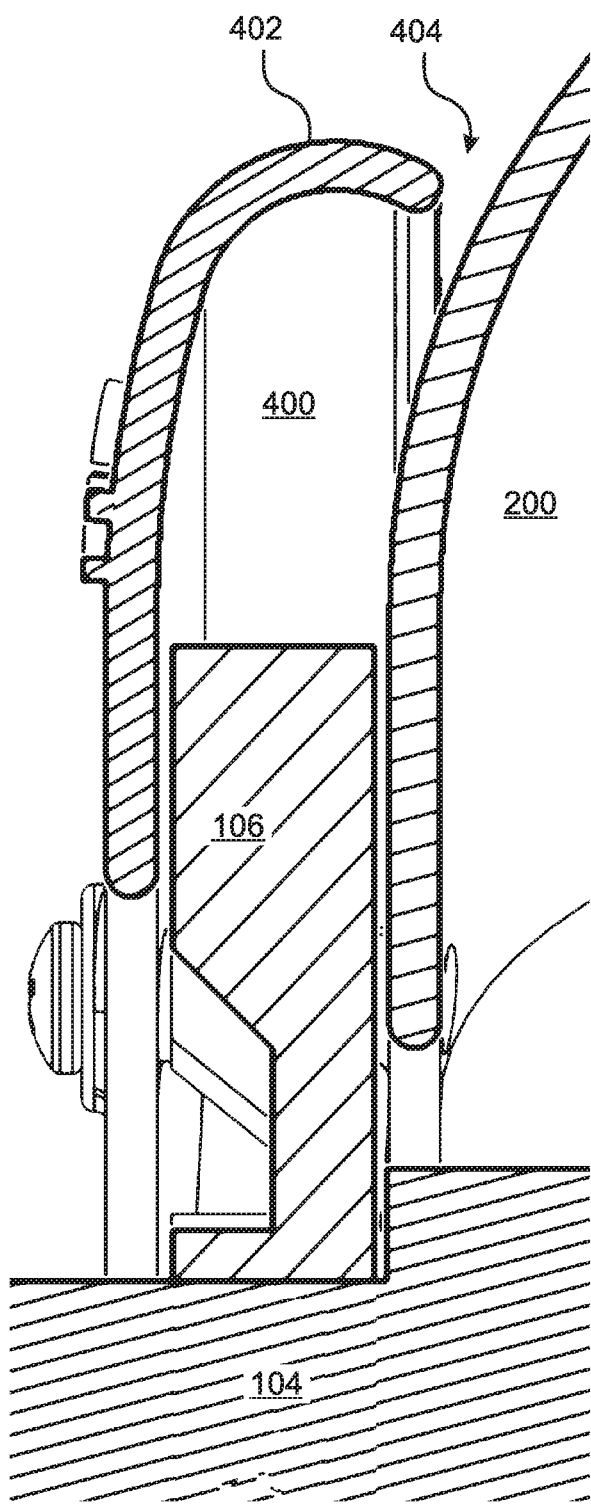
FIG. 4D is a close-up cross-sectional view drawn to scale of an embodiment similar to FIG. 4C.

With reference to FIGS. 4C and 4D, the periphery of the cover 400 can be curved 402 inward so as to form a reduced gap 404 between the periphery of the cover 400 and the Coanda surface 200 that functions as a nozzle to accelerate and direct the airflow and improve the uniformity of the flow.

Figure 5A:
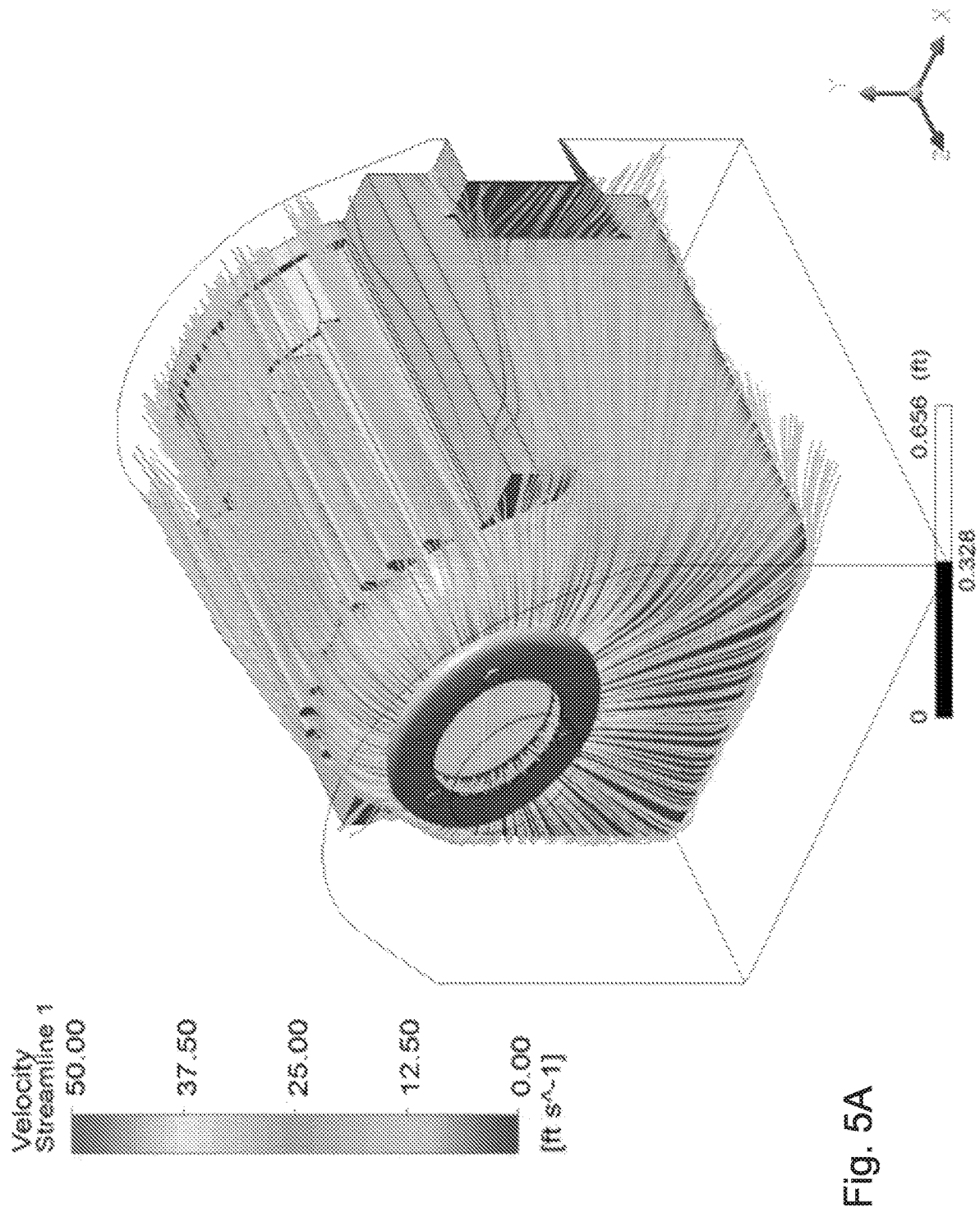
FIG. 5A is an illustration rendered in color that presents a visualization of simulation results applicable to an embodiment similar to FIG. 4D.
Figure 5B:
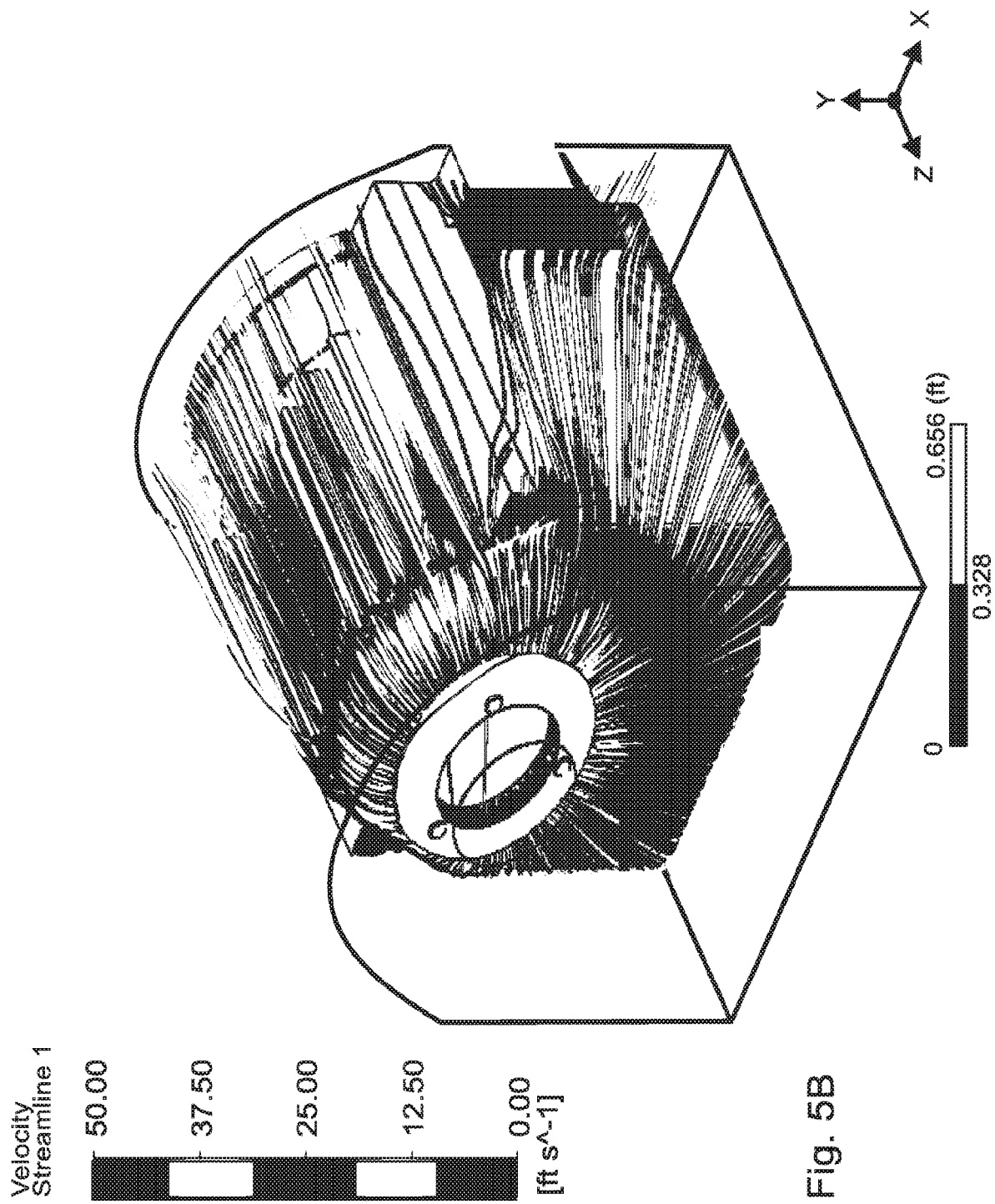
FIG. 5B presents the illustration of FIG. 5A rendered in half-toned format.

FIGS. 5A and 5B present a visualization of simulated air flow in the embodiment of FIG. 4D, where the simulation has been idealized with the simplifying assumption of completely radial air flow. FIG. 5A presents the visualization in color, whereas FIG. 5B presents a half-toned black-and white representation. As noted above, the airflow is initially perpendicular to the shaft 104, and thereby parallel and adjacent to the central region of the Coanda surface 200. Upon reaching the curved periphery of the Coanda surface 200, the airflow is compelled by the Coanda effect to follow the curvature and thereby to flow axially along the side 112 of the housing 102. At an airflow velocity of 90 cubic feet per minute, the cover 400 was able to create a uniform outlet flow and maintain velocities in the range of 10-25 ft/s axially along the side 112 of the housing 102.

By relying on the Coanda effect rather than on ducting to maintain the airflow close to the surfaces 112, 114 of the bearing housing 102, the bulk and cost of the cooling system is reduced, and also the cooling efficiency is further increased because heat that might otherwise have been trapped within the airflow by the ducting 108 is able to radiate outward from the flowing air directly to the surrounding environment. In addition, the number and complexity of parts that must be manufactured and assembled is reduced.

Due to the reduced fan blade size and power requirements, in embodiments the fan blade 106 is made from a polymer or other lightweight, non-metallic material, thereby reducing the likelihood of fan-induced rotor imbalance, improving rotor stability, and reducing the chance of rotor dynamic issues during operation of the device.

Figure 6:
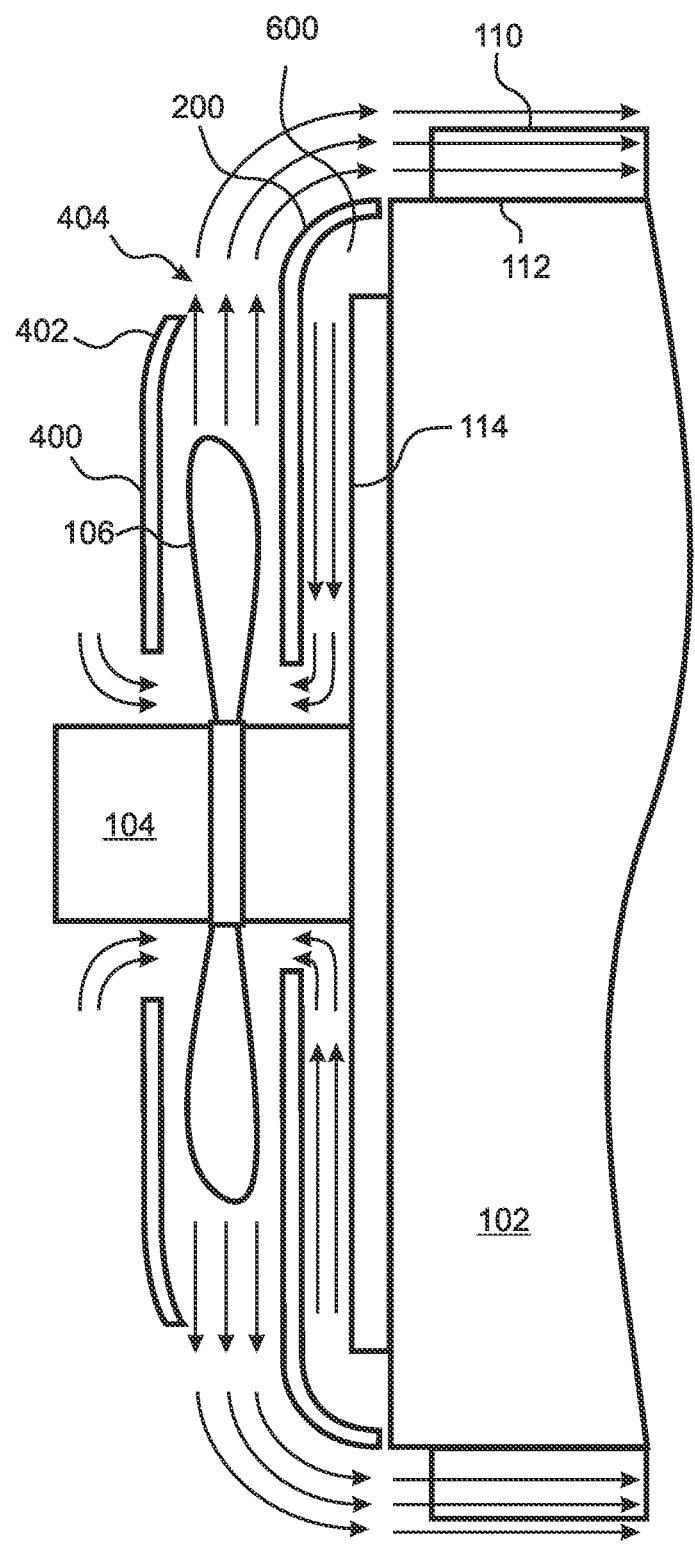
FIG. 6 is a cross-sectional view of an embodiment similar to FIG. 4A that includes a double-suction fan blade.

With reference to FIG. 6, in embodiments of the first general aspect the fan blade 106 is a double-suction blade 106 that draws air both from its exterior side and from its interior side, thereby drawing air out of the inter-surface space 600 between the Coanda panel 200 and the end face 114 of the bearing housing 102, and/or circulating air within the inter-surface space 600. In some of these embodiments, the edges of the fan blade 106 extend inward to the rotating shaft 104.

Figure 7:
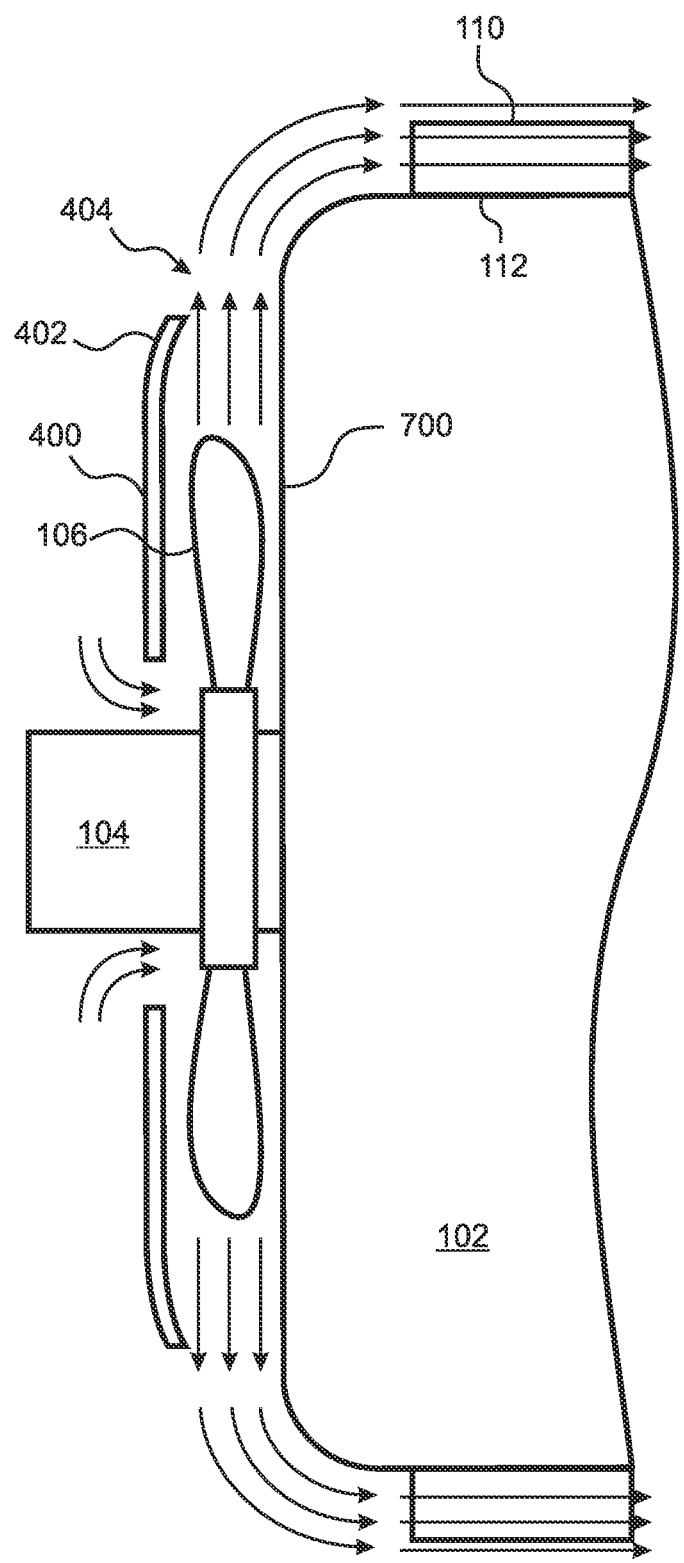
FIG. 7 is a cross-sectional view of an embodiment in which the end face of the bearing housing is the Coanda surface.

With reference to FIG. 7, a second general embodiment of the present invention is a bearing housing system that is air-cooled, in which the end face 700 of the bearing housing is configured as a Coanda surface 700, and a fan blade 106 is attached to the rotating shaft 104 adjacent and external to the bearing housing Coanda end face 700. It should be noted that the features included in embodiments of the first general aspect of the invention and discussed above with reference to FIGS. 2 through 5 are also included in embodiments of the second general aspect of the invention.

It should be understood that while reference is made throughout this disclosure to "air cooling" as well as to "bearings" and to a "bearing housing," the present disclosure is equally applicable to cooling via an applied flow of gas of any housing of a module from which a rotating shafts extends.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. An apparatus for air cooling a module of a system that includes a rotating shaft extending through and beyond an end face of a housing of the module, the end face being substantially perpendicular to the rotating shaft and a side of the housing being substantially parallel to the rotating shaft, the system comprising:
a Coanda panel mounted adjacent to the end face of the housing, the Coanda panel having a central opening through which the shaft extends,
an exterior Coanda surface of the Coanda panel having a central region that is radially perpendicular to the shaft and a periphery that curves smoothly from radial to axial, so that a rim of the Coanda surface is directed axially and is substantially aligned with the side of the housing;
a fan assembly including a fan blade and a fan cover; the fan blade is mounted to the shaft proximal and exterior to the Coanda surface and is located between the fan cover and the Coanda surface, both of the fan blade and the fan cover are smaller in diameter than the side of the housing and are configured to direct a flow of air parallel and adjacent to the Coanda surface, so that after it has flowed beyond the fan cover, the flow of air is attached by the Coanda effect to the Coanda surface, and is thereby redirected by the periphery of the Coanda surface, without impacting any ductwork, to the housing.

2. The apparatus of claim 1, wherein the fan blade is a double suction fan blade that is configured to draw air both from an exterior side of the fan blade and through the central opening of the Coanda panel from a space between the Coanda panel and the end face of the housing.

3. The apparatus of claim 1, wherein the fan cover includes a periphery that is curved inward so as to form a reduced gap between the periphery of the cover and the Coanda surface.

4. The apparatus of claim 1, wherein a bend radius of the Coanda surface periphery is at least two inches.

5. The apparatus of claim 1, wherein the fan blade is made from a non-metallic material.

6. The apparatus of claim 5, wherein the fan blade is made of a polymeric material.

7. The apparatus of claim 1, wherein the module is a bearing module that supports the rotating shaft.

8. The apparatus of claim 1, wherein the side of the housing is not surrounded by ductwork.

9. The apparatus of claim 1 wherein the Coanda surface is textured.

10. An air-cooled rotating shaft apparatus, the apparatus comprising:
a rotating shaft;
a module having a housing, the housing having an end face and a side, wherein:
the rotating shaft extends through and beyond the end face, the side of the housing is substantially parallel to the rotating shaft, and an exterior surface of the end face is a Coanda surface having a central region that is radially perpendicular to the shaft and a periphery that curves smoothly from radial to axial, so that a rim of the Coanda surface is directed axially and is substantially aligned with the side of the housing; and
a fan assembly including a fan blade and a fan cover; the fan blade is mounted to the shaft proximal and exterior to the Coanda surface and is located between the fan cover and the Coanda surface, both of the fan blade and the fan cover being smaller in diameter than the side of the housing, the fan assembly being configured to direct a flow of air parallel and adjacent to the Coanda surface, so that beyond the fan cover, the flow of air is attached by the Coanda effect to the Coanda surface and is thereby redirected by the periphery of the Coanda surface, without impacting any ductwork, to the housing.

11. The apparatus of claim 10, wherein the side of the housing includes axially extending radial fins.

12. The apparatus of claim 10, wherein the fan cover includes a periphery that is curved inward so as to form a reduced gap between the periphery of the cover and the Coanda surface.

13. The apparatus of claim 10, wherein a bend radius of the Coanda surface periphery is at least two inches.

14. The apparatus of claim 10, wherein the fan blade is made from a non-metallic material.

15. The apparatus of claim 14, wherein the fan blade is made of a polymeric material.

16. The apparatus of claim 10, wherein the module is a bearing module that supports the rotating shaft.

17. The apparatus of claim 10, wherein the side of the housing is not surrounded by ductwork.

18. The apparatus of claim 10, wherein the Coanda surface is textured.

\* \* \* \* \*